Patented Apr. 30, 1946

2,399,447

UNITED STATES PATENT OFFICE 2,399,447

AZO DYESTUFFS OF THE PYRAZOLONE SERIES

Eduard Moser, Riehen, Switzerland, assignor to Society of Chemical Industry in Basle, Basel, Switzerland, a Swiss firm No Drawing. Application March 6, 1945, Serial No. 581,348. In Switzerland November 16, 1943

7 Claims. (Cl. 260—153)

It has been found that the hitherto unknown azo-dyestuffs of the formula

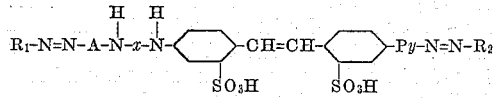

are valuable dyestuffs. In this formula $R_1$ stands for the radical of a compound having a keto group capable of undergoing enolization, A stands for an aromatic nucleus of the benzene series wherein the —N=N— group and the

group stand in 1:4-position to each other and which contains an atom grouping in ortho-position to the —N=N— group capable of producing complex metal compounds with the atom grouping —N=N—$R_1$, that is to say contains a carboxyl group or a hydroxyl group, $R_2$ stands for an aromatic radical having an atom grouping in ortho-position to the —N=N— group which is also capable of producing complex metal compounds in combination with the atom grouping —N=N—Py, Py stands for the pyrazolone nucleus of an 1-aryl-5-pyrazolone and $x$ stands for a connecting member derived from a heterocyclic compound having at least two mobile halogen atoms, such as cyanuric chloride.

Among these dyestuffs those are particularly valuable which correspond in the free form to the general formula

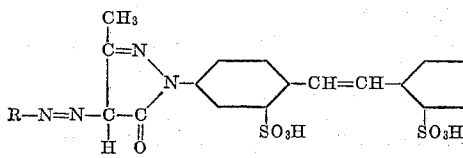

wherein R stands for an aromatic nucleus of the benzene series which contains as substituent at least one substituent standing in ortho-position to the —N=N— group and selected from the group consising of the OH— and the COOH— groups, $R_1$ stands for a member of the group consising of hydrogen and aromatic nuclei of the benzene series, and $x$ stands for a connecting link consisting of the radical of a six-membered heterocyclic compound the heterocyclic ring of which is composed of three to four carbon atoms and three to two nitrogen atoms, the

groups adjacent to $x$ being attached to carbon atoms of the hetero-ring.

The value of these dyestuffs resides in their property of forming valuable metalliferous complexes with agents yielding metal, especially agents yielding copper, which dye textile materials, especially materials consisting of natural or regenerated cellulose or materials containing natural or regenerated cellulose, valuable yellow shades. The new dyestuffs are valuable because they possess an excellent affinity for the above mentioned materials, either as such or in the form of their alkali salts. By after-treating the dyed materials with agents yielding metal, especially with agents yielding copper, there are obtained dyeings which are distinguished by their excellent fastness properties, especially by their excellent fastness to light, combined with an excellent fastness to washing. In certain cases also the complex metal compounds produced in substance may be direct dyeing dye-stuffs which produce dyeings on the fiber which possess valuable properties, especially an excellent fastness to light, without an after-treatment being necessary.

The new dyestuffs of the foregoing formula are made by methods known to be suitable for the manufacture of such products, for example by coupling 1 mol of an amino-azo dyestuff of the general formula

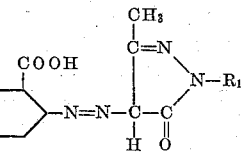

$$R_1-N=N-A-NH_2$$
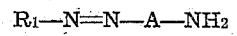

wherein A stands for an aromatic nucleus of the benzene series in which the —N=N— group and the $NH_2$-group stand in 1:4-position to each other and which contains a carboxyl group in ortho-position to the —N=N—R₁ group, R₁ stands for the radical of a compound having a keto group capable of undergoing enolization, with 1 mol of an aminoazo-dyestuff of the general formula

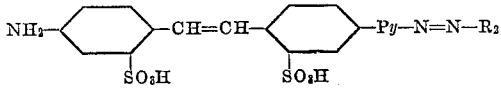

wherein Py stands for the pyrazolone radical of an 1-aryl-5-pyrazolone and R₂ stands for an aromatic residue possessing an atom grouping in ortho-position to the —N=N— group which is capable of yielding complex metal compounds in combination with the atom grouping

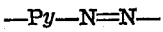

in known manner with the aid of heterocyclic compound of the kind of cyanuric chloride containing at least two mobile halogen atoms, and if desired treating the resulting dyestuffs with agents yielding metal.

Dyestuffs of the same constitution are obtained by coupling a pyrazolone derivative of the general formula

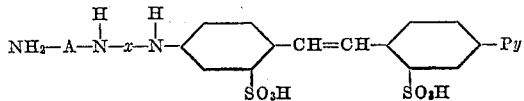

wherein $x$ and Py have the above given significance and A stands for an aromatic nucleus of the benzene series in which the NH₂-group and the —NH— group stand in 1:4-position to each other and which contains an atom grouping in ortho-position to the NH₂-group which is capable of yielding complex metal compounds with the atom grouping —N=N—R₁ of the contemplated azo dyestuff, first with a diazotized aromatic amine which carries also in ortho-position to the diazo group such an atom grouping which is capable of yielding complex metal compounds in the formed azo-dyestuff in combination with the azo group and the pyrazolone grouping, then diazotizing the resulting dyestuff and coupling it with a keto group capable of undergoing enolization.

It is also possible to start from a dyestuff of the general formula

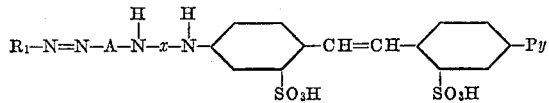

wherein R₁, A and Py have the above given significance, and couple this dyestuff, as indicated in the preceding paragraph, with a diazotized aromatic amine which contains in ortho-position to the diazo group such an atom grouping which is capable of yielding complex metal compounds in the resulting azo-dyestuff in combination with the azo group and the pyrazolone grouping.

As compounds containing keto groups capable of undergoing enolization there can be used, e. g., acetoacetic ester derivatives, such as arylides of acetoacetic acid or pyrazolones obtained by condensing hydrazines with acetoacetic ester. Such pyrazolones are, e. g., 3-methyl-5-pyrazolone and 1-phenyl-3-methyl-5-pyrazolone and derivatives thereof substituted in the benzene nucleus, e. g. by halogen atoms and sulfo groups. Further there can be used pyrazolones from other β-ketocarboxylic acid esters, e. g., oxalacetic ester; or still other products, e. g., malonic acid derivatives or barbituric acid derivatives, e. g., barbituric acid itself, or finally also further products, e. g., benzoylacetone or dihydroxyquinoline.

As heterocyclic compounds containing at least two mobile halogen atoms from which the connecting member x is derived, there can be used products such as cyanuric chloride, cyanuric bromide, 1 - phenyl - 3:5 - dichlorotriazine, 1-methyl-3:5-dichlorotriazine, dichloroquinazoline, tribromopyrimidine and the like. When the linkage is complete any existing mobile halogen atoms can be exchanged by reaction with compounds, such as ammonia, primary amines, such as monomethylamine, monoethanolamine, aniline, 1 - amino-4-hydroxybenzene-3-carboxylic acid, secondary amines, such as monomethylaniline and the like.

The diazo compound from aromatic amines which possess such an atom grouping in ortho-position to the amino group which in the finished azo dyestuff is capable of forming complex metal compounds in combination with the azo group and the pyrazolone grouping, is derived for example from compounds such as 1-hydroxy-2-aminobenzene, 1-hydroxy-2-amino-4-chlorobenzene, 1-hydroxy-2-amino-4-nitrobenzene, 1-hydroxy - 2 - amino-5-nitrobenzene, 1-hydroxy-2-amino-4:6- dinitrobenzene, 1-hydroxy-2-amino-5-nitro-6-chlorobenzene, 1-hydroxy-2-amino-4-methylbenzene, 1 - hydroxy-2-amino-4-nitro-6-chlorobenzene, 1-hydroxy-2-amine-4-nitrobenzene - 6 - sulfonic acid, 1-hydroxy-2-amino-6 - nitrobenzene - 4 - sulfonic acid, 1-hydroxy-2-aminobenzene-4-sulfamide, 1-hydroxy-2-amino-naphthalene-4:8-disulfonic acid, 2-hydroxy-1-aminonaphthalene-4-sulfonic acid, 2-hydroxy-1-amino-6-nitronaphthalene-4-sulfonic acid, 1-aminobenzene - 2 - carboxylic acid, 1-amino-4-chlorobenzene - 2 - carboxylic acid, 1-amino-4-nitro-benzene-2-carboxylic acid, especially however 1-amino-4-aroylaminobenzene-2-carboxylic acids, such as the products obtained by the action of aroylhalides, such as benzoylchloride, 4-chlorobenzoylchloride, 3-methoxy-benzoylchloride, benzoylchloride-3-sulfonic acid, naphthoic acid chloride, etc., on 1-formylamino-4-aminobenzene-2-carboxylic acid and subsequent saponification of the formyl group.

Among the dyestuffs of the present invention those are particularly valuable in which the radical R₁ is the radical of a 5-pyrazolone, especially the radical of 3-methyl-5-pyrazolone. Further, it has been found in general that the new dyestuffs are particularly valuable if the atom groupings of the radicals A and R₂ participating in the formation of complex metal compounds, are carboxyl groups. Reference has already been made to the 1-amino-4-aroylaminobenzene-2-carboxylic acid as starting material of the radical R₂.

As already mentioned above, the new dyestuffs are distinguished by a pronounced affinity for cellulose or regenerated cellulose, for example for textiles consisting of or containing such materials, e. g., mixtures of cotton and artificial threads from regenerated cellulose, or regenerated cellulose delustred by inorganic pigments, or mixtures of wool and such artificial fibers. The new dyestuffs dye these materials preferably yellow to brown shades. The fastness to light and the wet fastness properties of the non-metallized dyestuffs can be essentially improved by after-treatment with metal salts, especially copper salts. However, salts of other metals, such as cobalt, nickel, iron or chromium, can also be used. This metallization can be effected simultaneously with dyeing. As has also already been mentioned, it may be appropriate in many cases, to produce the metal compounds of the dyestuffs as such and use the metalliferous products for example like substantive dyes. In this case the dyestuffs can be metallized in the course of their production, that is to say coupling can be carried out in the presence of agents yielding metal.

The following examples illustrate the invention, but are not to be regarded as limiting it in any way, the parts being by weight, unless stated otherwise:

carbonate and a little ice are added and coupling is effected with the following diazo component:

12.8 parts of 4-benzoylamino-1-aminobenzene-2-carboxylic acid are dissolved in 140 parts of water and 7 parts of caustic soda solution of 30 per cent. strength and 3.5 parts of sodium nitrite are added thereto. This solution is poured at 0–5° C. into a mixture of 20 parts of hydrochloric acid of 30 per cent. strength and ice. Stirring is continued for 1 hour. The diazo compound has mainly precipitated. When coupling is complete the dyestuff is salted out, filtered and dried. The dyestuff corresponds in the free form to the formula

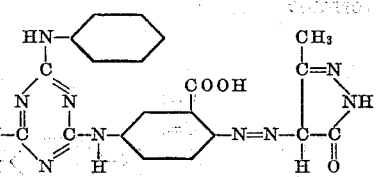

Example 1

A solution of 45.1 parts of the pyrazolone of the formula

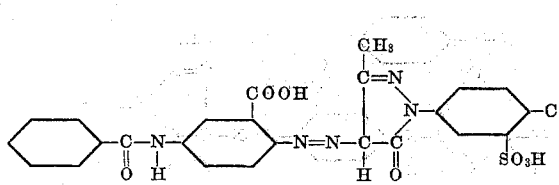

and 10.6 parts of sodium carbonate in 300 parts of water is added at 5° C. and within 30 minutes to a suspension of 18.4 parts of cyanuric chloride in little ice water and the hydrochloric acid which is being formed is neutralized with a solution of 8.4 parts of sodium bicarbonate in 30 parts of water. The whole is stirred for 2 hours at 0–5° C. A solution of 70° C. of 26.1 parts of the azo-dyestuff of the formula

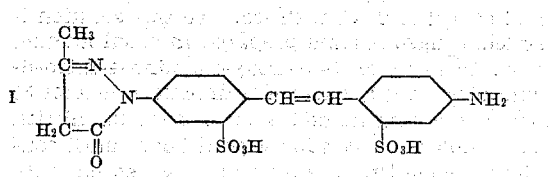

and 14 parts of caustic soda solution of 30 per cent. strength in 800 parts of water is then added and the temperature maintained for 2 hours at 35–40° C. A solution of 8.4 parts of sodium bicarbonate in 30 parts of water is thereupon introduced in drops and the mixture is further stirred for 4 hours at the same temperature. 18 parts of aniline are poured thereto, the whole is heated for 1 hour to 90–95° C., 5 g. of sodium carbonate are strewn in and the condensation product is salted out. 47.3 parts thereof are dissolved in 600 parts of water, 15 parts of sodium and is a red brown powder dissolving in water or concentrated sulfuric acid to a brown solution.

The same dyestuff is obtained by coupling 35.9 parts of the azo-dyestuff from 4-benzoylamino-1-amino-benzene-2-carboxylic acid and the pyrazolone of the Formula I with 9.2 parts of cyanuric chloride at 0–5° C., then further condensing with 13 parts of the azo dyestuff of the Formula II at 35–40° C. and subsequently stirring with 9 parts of aniline for 1 hour at 90–95° C. The dyestuff is then salted out, filtered and dried.

Similar dyestuffs are obtained when replacing the 18 parts of aniline in the first paragraph of this example by 22 parts of meta-toluidine or mono-methylaniline. This reaction can also be carried out inter alia with ammonia, mono-ethylamine, mono-ethanolamine or diethylamine.

Example 2

61.6 parts of the dyestuff from diazotized 2-amino-1-hydroxy-4-nitrobenzene and the pyrazolone of the Formula I of Example 1 are dissolved with 10.6 parts of sodium carbonate in 250 parts of water and the solution thus obtained is poured at 0–5° C. into a suspension of 18.4 parts of cyanuric chloride in ice water. The hydrochloric acid which is liberated is neutralized with a solution of 8.4 parts of sodium bicarbonate in 30 parts of water. A solution of 70° C. of 26.1 parts of the azo-dyestuff of the Formula II of Example 1 and 14 parts of caustic soda solution of 30 per cent. strength in 800 parts of water is added and a solution of 8.4 parts of sodium bicarbonate in 30 parts of water is then introduced in drops in the course of 2 hours. The whole is stirred for a further 4 hours at 35–40° C., 18 parts of aniline are added and the mixture is heated for 1 hour to 95° C. The finished dyestuff which corresponds in the free form to the formula

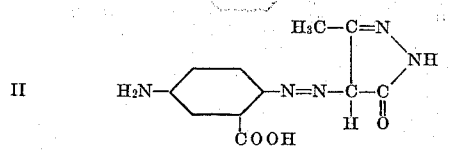

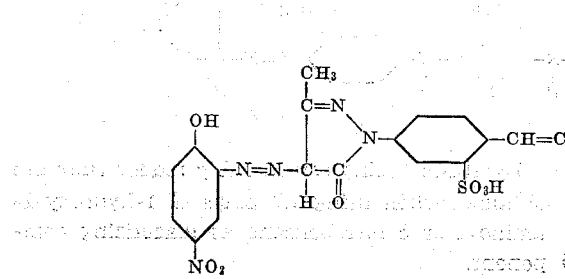

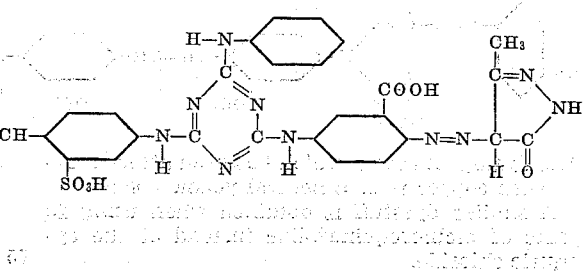

is precipitated with common salt, filtered and dried. The dyeing on cotton which has been after-treated with copper is orange. A similar dyestuff corresponding in the free form to the formula

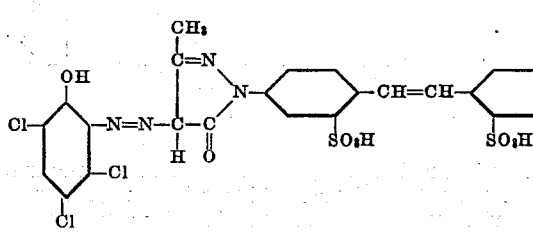

is obtained when using 21.2 parts of 1-amino-2-hydroxy-3:5:6-trichlorobenzene instead of 2-amino-1-hydroxy-4-nitrobenzene.

Dyestuffs dyeing redder tints are obtained by using 1-amino-2-hydroxy-3-nitro-5-chlorobenzene or 1-amino-2-hydroxy-3-chloro-5-nitrobenzene.

Example 3

67.8 parts of the dyestuff from 1-amino-4-bromobenzene-2-carboxylic acid and the pyrazolone

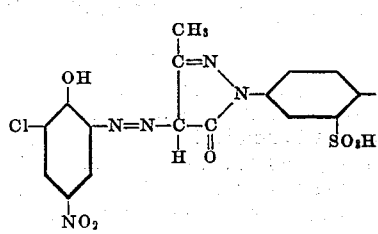

of the Formula I of Example 1 are condensed at 0–5° C. with 18.4 parts of cyanuric chloride according to the data of Example 2, and this primary condensation product is then condensed at 35–40° C. with 26.1 parts of the dyestuff of the Formula II of Example 1. The product is then heated for 1 hour to 95° C. with 18 parts of aniline, the dyestuff is salted out, filtered and dried. The new dyestuff corresponds in the free form to the formula

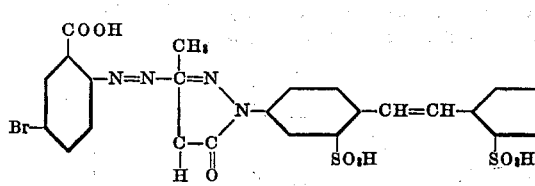

The dyeing on cotton which has been after-treated with copper is of a neutral yellow color.

A similar dyestuff is obtained when using 20 parts of dichloroquinazoline instead of the cyanuric chloride.

Example 4

47.3 parts of the condensation product of the probable formula

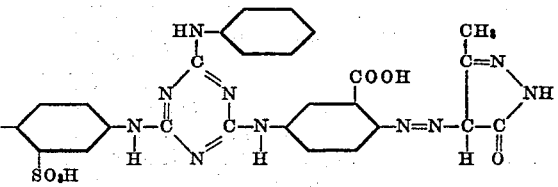

obtained according to Example 1 and 15 parts of sodium carbonate are dissolved in 600 cc. of water and cooled to 0° C. with ice. To this solution is added a diazo magma prepared in usual manner from 19 parts of 1-hydroxy-2-amino-4-nitro-6-chlorobenzene, 15 parts of hydrochloric acid of 30 per cent. strength and 3.5 parts of sodium nitrite. The whole is stirred for several hours until coupling is complete, the dyestuff is salted out with common salt, filtered and dried. It is a brown powder which corresponds in the free form to the formula

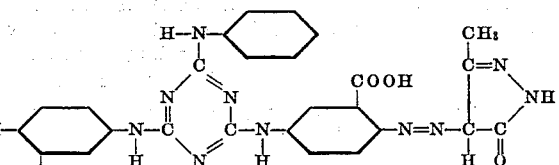

which dissolves in water to a red brown solution and in concentrated sulfuric acid to a yellow brown solution. The dyeings produced with this dyestuff on cotton and aftertreated with copper are of reddish yellow color.

A similar dyestuff is obtained when using 10.6 parts of 1-hydroxy-2-amino-3:4:6-trichlorobenzene instead of 1-hydroxy-2-amino-4-nitro-6-chlorobenzene.

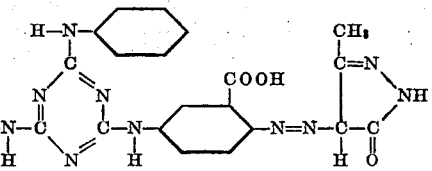

Dyestuffs dyeing considerably redder tints are obtained when using 7.7 parts of 1-hydroxy-2-amino-4- or 5-nitrobenzene as diazotizing component.

*Example 5*

35.9 parts of the azo-dyestuff of the formula

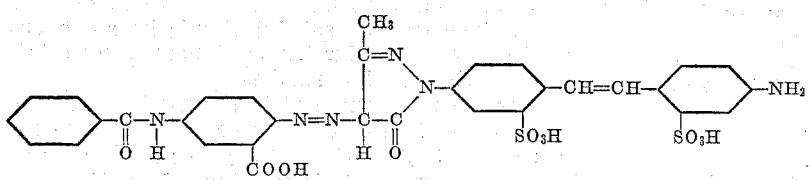

are dissolved with 8 parts of sodium carbonate in 500 parts of water and the solution is introduced in drops at 0–5° C. to a freshly prepared suspension of 9.2 parts of cyanuric chloride in ice water. The hydrochloric acid which is liberated is neutralized within 1 hour with a solution of 4.2 parts of sodium bicarbonate in 20 parts of water. A solution of 22.6 parts of the azo-dyestuff of the formula

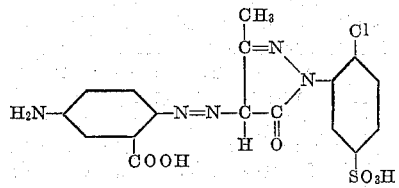

with 10.6 parts of sodium carbonate in 400 parts of water is added and the temperature is maintained for 2 hours at 35–40° C. A solution of 4.2 parts of sodium bicarbonate in 20 parts of water is then added in drops and stirring is continued for 4 hours at the same temperature. After addition of 9 parts of aniline the whole is heated for 1 hour to 90–95° C., 5 parts of sodium carbonate are strewn in and the dyestuff is precipitated with common salt, filtered and dried. The dyestuff corresponding in the free form to the formula

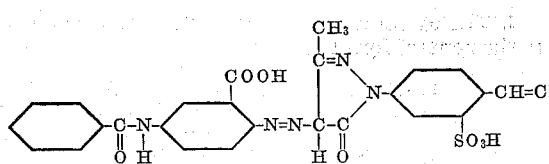

is a brown powder dissolving in water or concentrated sulfuric acid to a brown solution, the dyeings of which on cotton after-treated with copper being of reddish yellow color.

*Example 6*

A solution of 45.1 parts of 4″-aminostilbene-2′:2″-disulfonic acid-4′-[3-methyl-5-pyrazolone] and 10.6 parts of sodium carbonate in 250 parts of water is added, while thoroughly stirring at 0–5° C., to a freshly prepared suspension of 18.4 parts of cyanuric chloride in ice water. The hydrochloric acid which is liberated is neutralized in the course of two hours with a solution of 8.4 parts of sodium bicarbonate in 60 parts of water. A solution of 18.2 parts of 1-amino-4-nitrobenzene-5-carboxylic acid in 200 parts of water and 14 parts of caustic soda solution of 30 percent. strength is then added. The whole is heated to 40° C., stirred for about two hours and a solution of 8.4 parts of sodium bicarbonate in 60 parts of water is added in drops. After addition of 18 parts of aniline the mixture is heated for 1 hour to 90–100° C. The condensation product of the probable formula

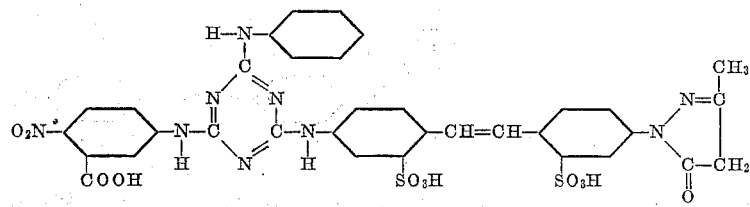

is precipitated with 60 parts of hydrochloric acid of 30 per cent. strength and filtered. It is then dissolved with 18 parts of sodium carbonate in 800 parts of water, a solution of 36 grams of crystallized sodium sulfide in 150 parts of water is added and the mixture is heated for 2 hours at 60–65° C., then acidified with hydrochloric acid of 30 per cent. strength and filtered. For the purpose of purification the amino product is dissolved in 1000 parts of water and sodium carbonate, filtered from sulfur and again isolated by acidifying with hydrochloric acid.

38.5 parts of this product are dissolved with 20 parts of sodium carbonate in 400 parts of water, cooled with ice to 5° C. and added to a diazo solution prepared in known manner from 12.8 parts of 1-amino-4-benzoylamino-benzene-2-carboxylic acid. Stirring is continued until coupling is complete. The aminoazo dyestuff is precipitated by addition of common salt and filtered. It is dissolved in 400 parts of hot water, 3.5 parts of sodium nitrite are added and the whole is

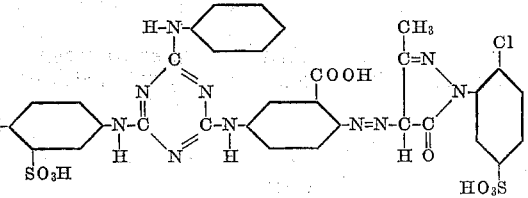

poured to a mixture of ice and 32 parts of hydrochloric acid of 30 per cent. strength, cooled to 10–15° C. The diazotization is complete after 2 hours. The diazo magma is poured into a cooled solution of 5 parts of 3-methyl-5-pyrazolone and 20 parts of sodium carbonate in 80 parts of water and the whole is stirred for several hours. The dyestuff which has precipitated is then filtered and dried. It is identical with the dyestuff obtained according to Example 1.

*Example 7*

35.9 parts of the aminoazo dyestuff of the first formula of Example 5 are dissolved with 8 parts of sodium carbonate in 500 parts of water and the solution is added in drops at 0–5° C. to a freshly prepared suspension of 9.2 parts of cyanuric chloride in ice water. The hydrochloric acid which is liberated is neutralized within 1 hour with a solution of 4.2 parts of sodium bicarbonate in 30 parts of water. A solution consisting of 21.2 parts of the aminoazo-dyestuff of the formula

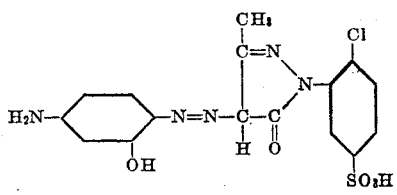

[prepared from 15.4 parts of diazotized 1-amino-2-hydroxy-4-nitrobenzene and 28.8 parts of 1-(2'-chloro-5'-sulfo)-phenyl-3-methyl-5-pyrazolone and subsequent reduction with 36 parts of crystallized sodium sulfide for 2 hours at 60–65° C.] and 5.3 parts of sodium carbonate in 400 parts of water is added and the temperature is maintained for 2 hours at 35–40° C. A solution of 4.2 parts of sodium bicarbonate in 30 parts of water is then added in drops and stirring is continued for 4 hours at 40° C. After addition of 9 parts of aniline the mixture is heated for 1 hour to 90–95° C., 5 parts of sodium carbonate are strewn in and the dyestuff is precipitated with common salt, filtered and dried. The dyestuff corresponding in the free form to the formula

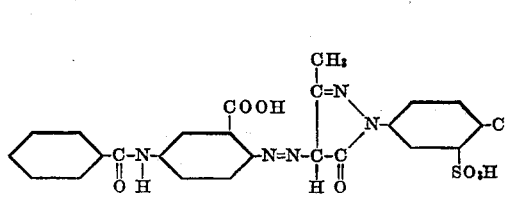

is a brown powder dissolving in water to a red-brown solution, in concentrated sulfuric acid to a yellow brown solution, the dyeings of which on cotton after-treated with copper being of reddish yellow color.

*Example 8*

100 parts of cotton are introduced at 40–50° C. into a dyebath consisting of 3000 parts of water, 1.5 parts of dyestuff prepared according to the first part of Example 1 and 2 parts of sodium carbonate. The bath is heated to 90–95° C. within ½ hour, 30 parts of crystallized sodium sulfate are added and dyeing is continued at this temperature for ¾ hour. A solution of 2 parts of crystallized copper sulfate and 2.5 parts of tartaric acid in 100 parts of water neutralized with caustic soda solution is then added to the dyebath and the cotton is treated during ½ hour at about 95° C., then rinsed in the usual manner and dried. It is dyed fast yellow shades.

As already mentioned in the specification, the dyestuffs of this invention can also be used for dyeing mixed fabrics, such as for example mixtures of wool and viscose staple fiber. In such cases dyeing can be effected in a neutral bath in the presence of sodium chromate or potassium chromate.

What I claim is:

1. The dyestuffs corresponding in the free form to the general formula

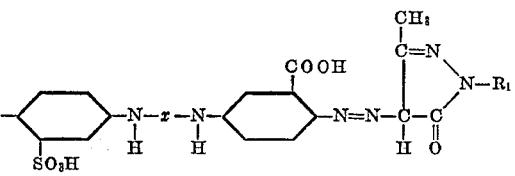

wherein R stands for an aromatic nucleus of the benzene series which contains as substituent at least one substituent standing in ortho-position to the —N=N— group and selected from the group consisting of the OH— and the COOH— groups, $R_1$ stands for a member of the group consisting of hydrogen and aromatic nuclei of the benzene series, and $x$ stands for a connecting link consisting of the radical of a six-membered heterocyclic compound the heterocylic ring of which is composed of three to four carbon atoms and three to two nitrogen atoms, the

—N—
 |
 H groups adjacent to $x$ being attached to carbon atoms of the hetero-ring.

2. The dyestuffs corresponding in the free form to the general formula

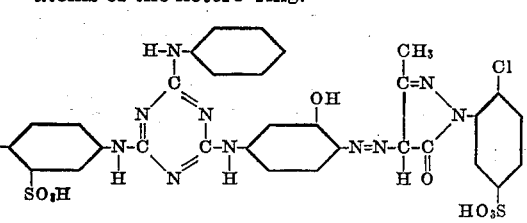

wherein R stands for an aromatic nucleus of the benzene series which contains as substituent at least one substituent standing in ortho-position to the —N=N— group and selected from the group consisting of the OH— and COOH— groups, $R_3$ stands for a member selected from the group consisting of hydrogen and alkyl, $R_4$ stands for a member selected from the group consisting of hydrogen, alkyl and aryl nuclei of the benzene series, and $R_1$ stands for a member of the group consisting of hydrogen and aromatic nuclei of the benzene series.

3. The dyestuffs corresponding in the free form to the general formula

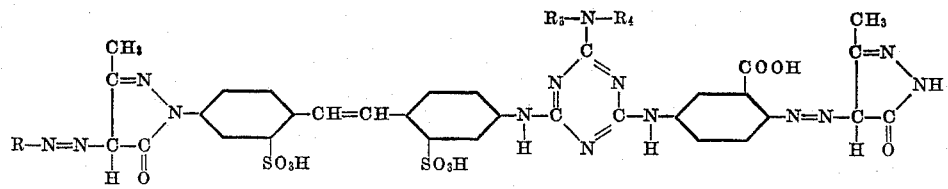

wherein R stands for an aromatic nucleus of the benzene series which contains as substituent at least one substituent standing in ortho-position to the —N=N— group and selected from the group consisting of the OH— and COOH— groups, $R_3$ stands for a member selected from the group consisting of hydrogen and alkyl, and $R_4$ stands for a member selected from the group consisting of hydrogen, alkyl and aryl nuclei of the benzene series.

4. The dyestuffs corresponding in the free form to the general formula

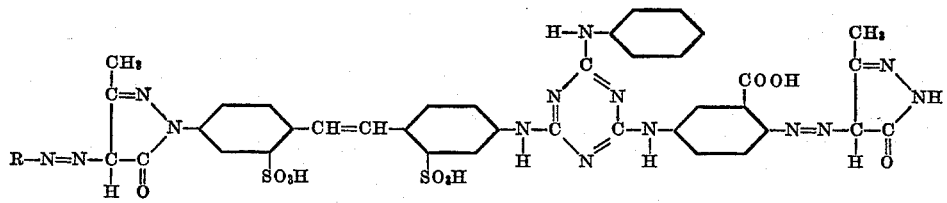

wherein R stands for an aromatic nucleus of the benzene series which contains as substituent at least one substituent standing in ortho-position to the —N=N— group and selected from the group consisting of the OH— and the COOH— groups.

5. The dyestuff corresponding in the free form to the formula

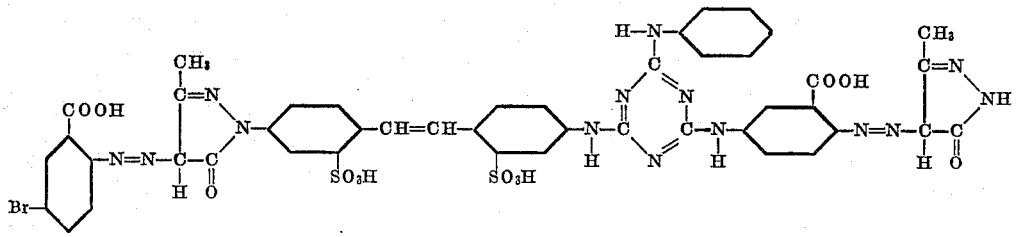

6. The dystuff corresponding in the free form to the formula

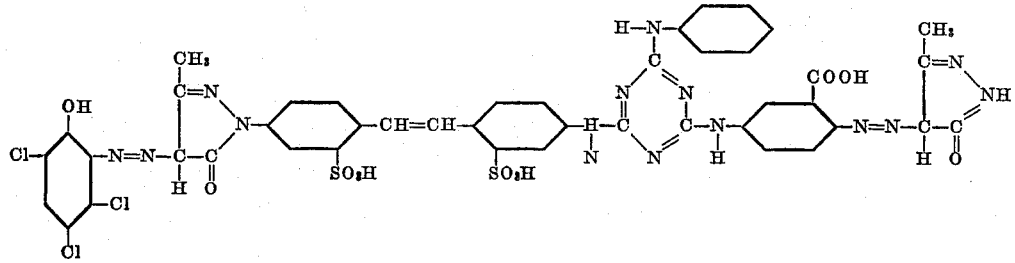

7. The dyestuff corresponding in the free form to the formula

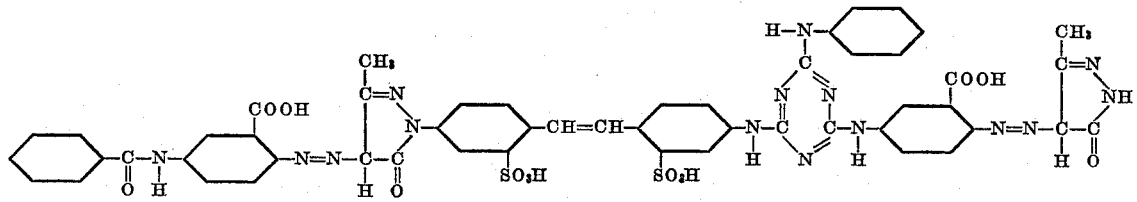

EDUARD MOSER.